(12) United States Patent
Lawson et al.

(10) Patent No.: US 6,870,690 B1
(45) Date of Patent: Mar. 22, 2005

(54) DUAL-BAND LENS

(75) Inventors: John Lawson, Sahaurita, AZ (US); Jan David Ter Louw, Franklin Lakes, NJ (US)

(73) Assignee: CBC-America, Commack, NY (US)

( * ) Notice: Subject to any disclaimer, the term of this patent is extended or adjusted under 35 U.S.C. 154(b) by 0 days.

(21) Appl. No.: 10/658,212

(22) Filed: Sep. 9, 2003

(51) Int. Cl.[7] .............................................. G02B 13/00
(52) U.S. Cl. ...................................... 359/722; 359/721
(58) Field of Search ................................. 351/721–723; 359/721–723

(56) References Cited

U.S. PATENT DOCUMENTS

| | | | | |
|---|---|---|---|---|
| 2,978,956 | A | * | 4/1961 | Howell ........................ 359/356 |
| 5,080,472 | A | * | 1/1992 | Gupta .......................... 359/652 |
| 5,212,589 | A | | 5/1993 | Goodman |
| 5,329,347 | A | * | 7/1994 | Wallace et al. ............. 356/4.01 |
| 5,497,266 | A | * | 3/1996 | Owen .......................... 359/353 |
| 5,565,668 | A | * | 10/1996 | Reddersen et al. ..... 235/462.22 |
| 5,729,376 | A | | 3/1998 | Hall et al. |
| 5,781,336 | A | | 7/1998 | Coon et al. |
| 6,018,414 | A | | 1/2000 | Chipper |
| 6,208,459 | B1 | | 3/2001 | Coon et al. |
| 6,477,326 | B1 | | 11/2002 | Partynski et al. |
| 2002/0185541 | A1 | | 12/2002 | Matsuura et al. |

OTHER PUBLICATIONS

Bernhard Lau & Volker Bartel, Novel opthalmascope incorporating a double axicon, SPIE vol. 2927, p. 55–60.

* cited by examiner

*Primary Examiner*—Georgia Epps
*Assistant Examiner*—M. Hasan
(74) *Attorney, Agent, or Firm*—Mark A. Lundgren

(57) ABSTRACT

A single lens or optical system is used to image two different optical bands, for example visible and infrared, with the same possible adjustments in zoom and/or focus. A dual band singlet is formed of a first, larger, optical element, suitable for operating on light of a first optical band, with an aperture cut out of it. A smaller element, suitable for operating on light of a second optical band, is secured in, or on either side of, the aperture cut through the larger optical element, thus forming a dual band singlet that can operate on two different wavelength bands. Combinations of dual band lenses, lens elements, and lenses with cut-out apertures are used to form dual-band optical systems, including systems with dual-band focus and zoom.

21 Claims, 7 Drawing Sheets

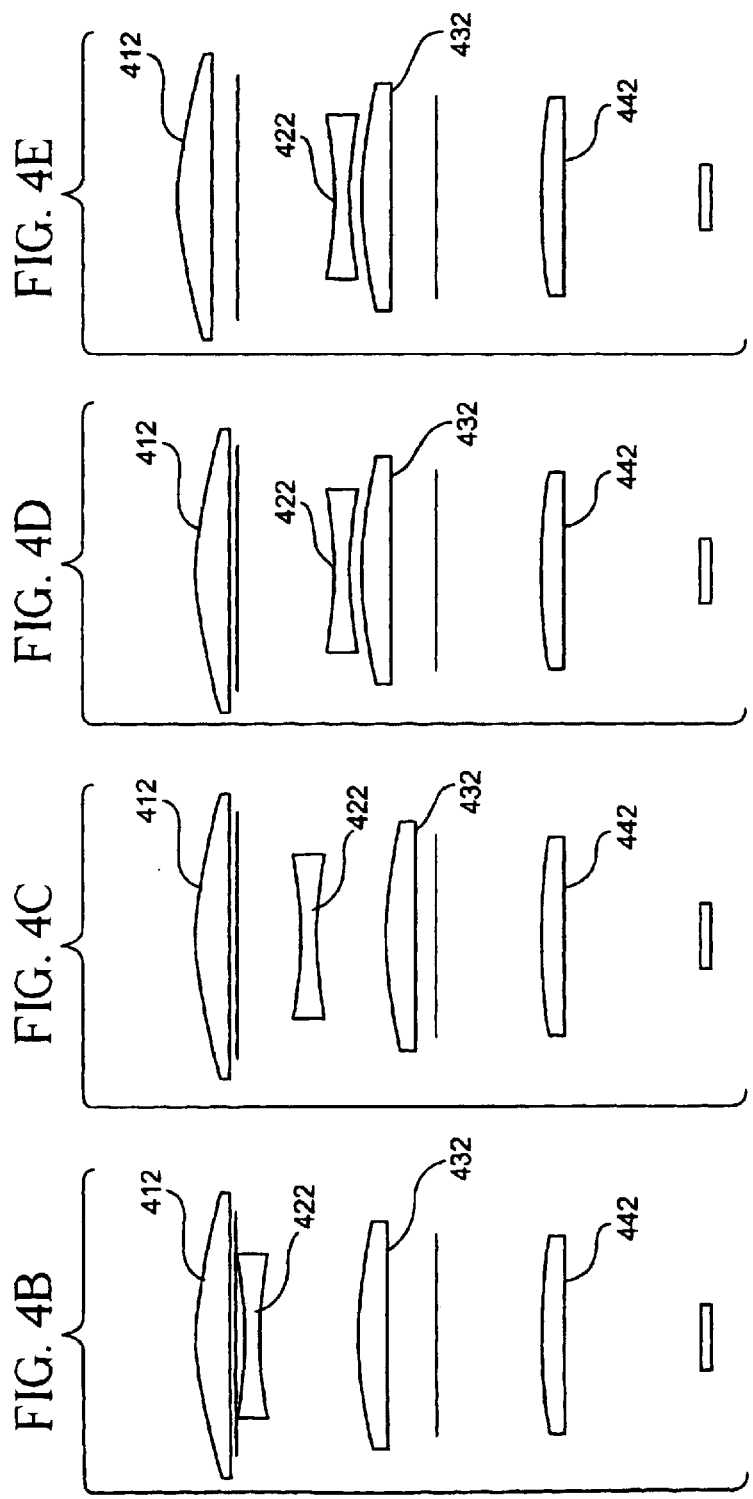

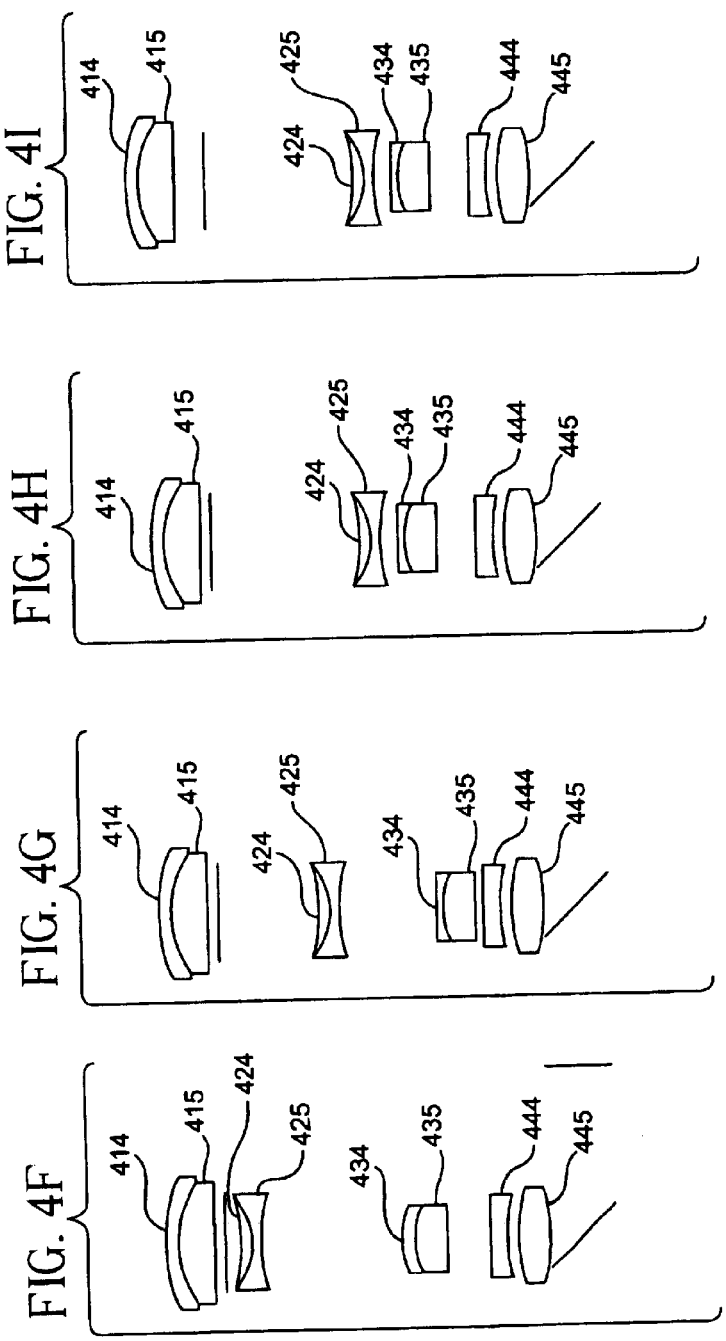

DUAL-BAND LENS

FIELD OF THE INVENTION

1. Field

Embodiments relate to the field of optics and in particular to imaging lenses.

2. Related Art

Different cameras, sensitive to different optical wavelength bands, are commercially available for a variety of applications. For example, visible cameras and infrared cameras are used in industrial, security, and rescue applications. Infrared and Ultraviolet cameras are used in fire detection. It can be advantageous to have two different cameras, sensitive to two different wavelength bands, observe the same scene. For example, a visible camera could be combined with an infrared camera. The visible camera would show a typical image of a scene, so that an operator could see normally. Meanwhile, the infrared camera would show the operator where there were hot-spots.

One approach to providing dual waveband viewing is to mount two separate cameras on a common base. Another approach is to use a shared reflective optical system, because reflective systems can typically process light of many different wavelengths. After passing through the reflective system, the light from each band is separated and directed to its own imaging device. However, there are problems with both approaches.

When two separate cameras are mounted on a common base, they do not view objects along the same optical axis. Therefore, there is parallax between the two cameras; objects don't line up identically in the two cameras at all field distances. An exception is the case where there is a common aperture, and a beam-splitter is used to direct light of each wavelength band to each camera. However, as aperture increases, a larger and larger beam-splitter is required. As beam-splitter size increases, so does cost and difficulty of manufacture.

Further, if the two cameras have adjustable focus or zoom, matching focus or zoom changes between the two separate systems can be difficult. Typical zoom or focus settings on cameras are not precisely metered or calibrated. Therefore, it is likely that the two cameras might focus at different object distances or have different magnification (different image size for the same object). This could make it difficult to recombine the images on a single display, or perform data fusion or other image processing. Two separate systems also have more mass and take up more space than a single camera.

When a reflective lens is used, multiple wavelengths can be imaged simultaneously through the same reflective optics. However, reflective systems are difficult to focus by element motion, typically take up more space than refractive systems, and are difficult to design with zoom features.

Therefore, what is needed is a refractive lens system which can image scenes in two differing wavelength bands, through the same aperture, and which can provide focus and zoom capability for both wavelength bands with the same adjustments.

SUMMARY OF THE INVENTION

Embodiments include a lens formed of two lens elements: a smaller lens element fixed within an aperture cut through a larger lens element. In some embodiments, a lens is formed of an infrared lens element and a visible lens element. Embodiments include optical systems that contain dual wavelength lenses, so that a single optical system can image the same scene in two different optical wavelength bands through the same aperture. Embodiments include systems with common zoom and focus groups, capable of imaging in dual wavelength bands (for example visible and infrared, visible and UV, UV and infrared, two infrared bands) simultaneously.

BRIEF DESCRIPTION OF THE ILLUSTRATIONS

FIG. 4B–FIG. 4I are diagrams that illustrate the motions of infrared and visible subsystems in a dual band lens, according to the present invention.

DESCRIPTION

Figure 1:
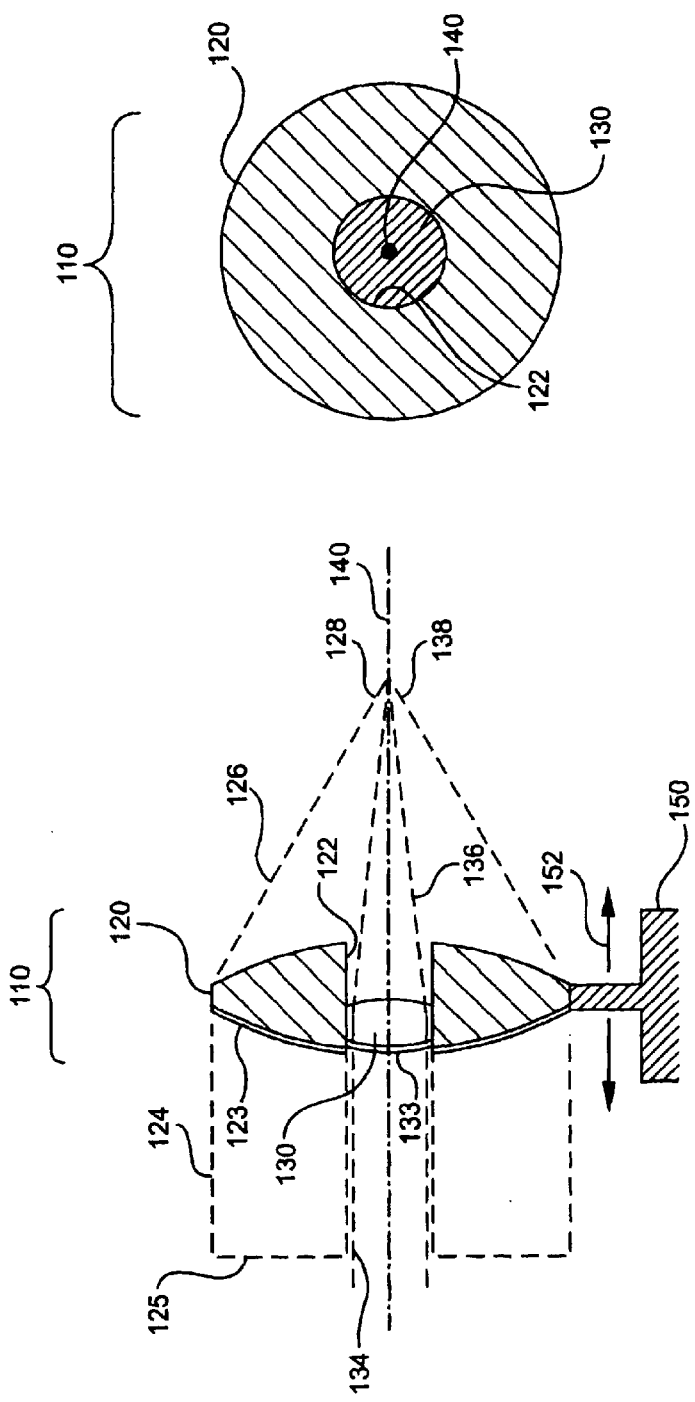
FIG. 1A and FIG. 1B are plan and axial views of a single dual-band lens, according to the present invention.

FIG. 1A and FIG. 1B are plan and axial views of a single dual-band lens, according to the present invention. The dual bands may be any optical bands (e.g., near-infrared, mid-infrared, long-infrared, very-long-infrared, visible, ultraviolet). Dual-band lens 110 is formed of first lens element 120, which is constructed of a refractive optical material. In some embodiments, for example, where infrared light is to be imaged, lens element 120 is formed of a suitable infrared lens material (e.g., Ge, Si, ZnSe, CaF2) that transmits and refracts infrared light. In some embodiments, lens element 120 is formed of a suitable visible lens material (e.g., BK7, F2) that transmits and refracts visible light, or another wavelength-appropriate material, depending on the wavelength band for which imaging is to be performed.

Lens element 120 is formed with sub-aperture 122 cut out. Sub aperture 122 may be formed during casting of the lens, drilled out of the substrate, or any other process. In some embodiments, sub-aperture 122 is circular and concentric with lens element 120. In some embodiments, undesired light is excluded by coating 123 on lens element 120, by the spectral transmittance properties of the material of which lens element 120 is formed, or other means, such as a filter placed in front of lens element 120.

Wavelengths of light for which lens element 120 is designed, travel along paths represented by ray path 124, through aperture-portion 125. The light is refracted (focused) by lens element 120 and proceeds along ray path 126 to focus point 128, which may be an image.

Lens element 130 is shown fixed in sub-aperture 122. However, lens element 130 could also be disposed on either side of sub-aperture 122. Lens element 130 is formed of a refractive optical material, appropriate for a second optical wavelength band. Undesired wavelengths of light can be excluded by appropriate wavelength-selective coating 133, the material of lens element 130, a filter earlier in the optical path, or any other method.

Light suitable to refraction by lens element 130 travels along ray path 134 and is focused along ray path 136 towards focus 138. In some embodiments, lens element 130 and lens element 120 have the same focal length so that focus 138 is at the same point as focus 128 on optical axis 140. Thus, portion 125 of the aperture of dual lens 110 is occupied by lens element 120 and another aperture-portion, defined by sub-aperture 122, is occupied by lens element 130.

In some embodiments, dual lens 110 may be attached to focus mechanism 150, which can move lens 110 along direction 152, in order to move positions 128 and 138 along optical axis 140, adjusting the focus.

FIG. 1B is an axial view of lens 110, including lens element 120, sub-aperture-122, lens element 130, and optical axis 140. In some embodiments, lens elements 120 and 130 are circular and concentric. In some embodiments, sub-apertures such as sub-aperture 122 are not circular (e.g., rectangular, oval), and are not necessarily concentric with lens elements such as lens element 120.

Figure 2:
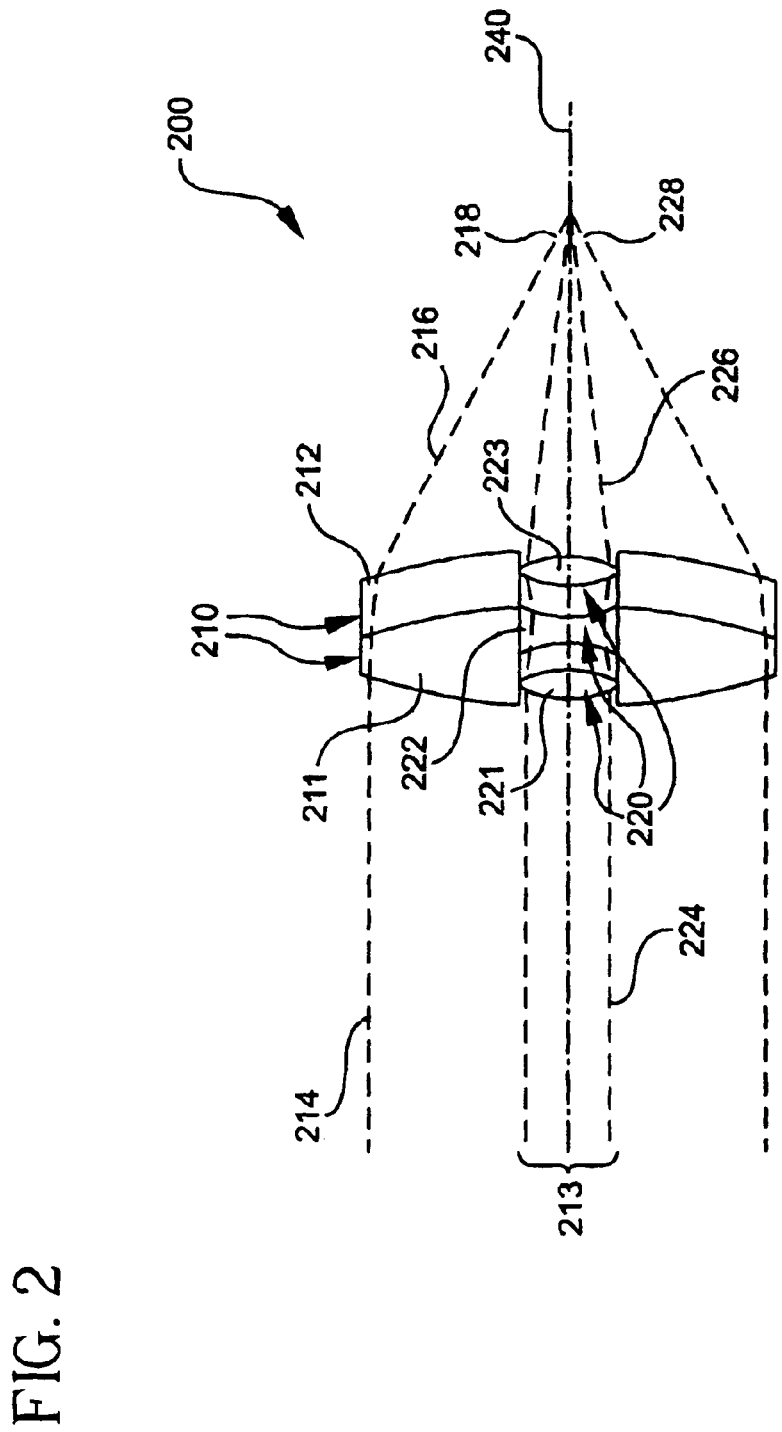
FIG. 2 is a plan view of a complex dual-band lens, according to the present invention.

FIG. 2 is a plan view of complex dual-band lens 200. Dual band lens 200 includes optical subsystem 210 and optical subsystem 220. Optical subsystem 210 is a doublet, formed of lens element 211 and lens element 212. Sub-aperture 213 is cut-through optical system 210. Incoming light travels along ray path 214, is refracted by optical subsystem 210, and converges along paths represented by ray path 216, to focus 218. Of course, optical sub-systems 210 and 220 could be of any optical system forms, including systems with several lenses. Optical subsystems 210 and 220 could have finite objects, be afocal, or have any desired optical functions.

Optical subsystem 220 includes lens elements 221, 222, and 223. Optical subsystem 220 fits substantially within sub-aperture 213. Light travels along ray path 224, and converges along ray path 226 to focus 228. If optical systems 210 and 220 have the same focal length, then focus 218 and focus 228 are at the same point along optical axis 240. However, in some embodiments, optical subsystems have different focal lengths, are shapes other than circular (e.g. square, oval), or may be eccentric (rather than concentric).

Optical subsystem 210 and optical subsystem 220 are designed to accept and operate on light of different wavelengths, so that images 218 and 228 are formed of light from different wavelength bands.

Figure 3:
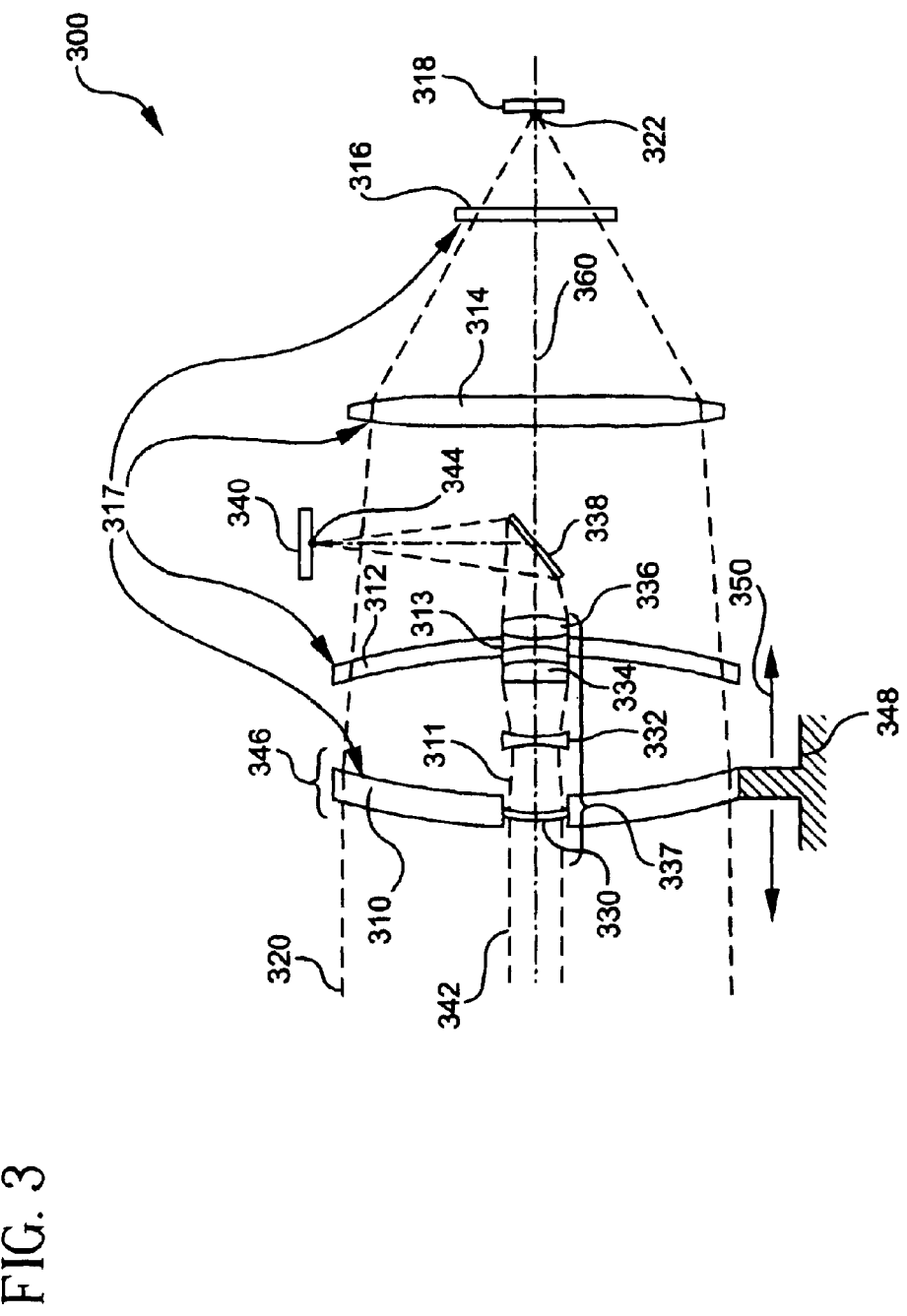
FIG. 3 is a plan view of a dual band lens with a focus group, according to the present invention.

FIG. 3 is a plan view of a dual band lens, according to the present invention. In lens 300, lens elements 310, 312, 314, and 316, form optical subsystem 317, suitable for imaging light of one wavelength band, for example an infrared band. Light enters along ray path 320 and converges to image 322 on optical axis 360. Image recording device 318, for example a focal plane or film, receives image 318. Lens elements 310 and 312 have cut-out sub-apertures 311 and 313.

Lens elements 330, 332, 334, and 336 form optical subsystem 337, suitable for imaging light a second wavelength band, for example a visible band. Lens element 330 is fixed inside the sub-aperture of lens element 310 and lens elements 334 and 336 are fixed in the sub-aperture of lens element 312. Light travels along ray path 342, is brought out from optical axis 360 by fold element 338 (e.g., mirror, prism), and focuses at image 344. Image recording device 340 is placed to receive image 344.

In some embodiments, other configurations are used to reach image 344. In some embodiments, image 344 is formed on optical axis 360, and imaging device 340 is placed on optical axis 360, similar to the elements of optical system 337. In some embodiments, one imaging device records both optical bands. Many different fold configurations can be used to direct image 344 or image 322 to different paths or locations.

It can be seen that lens elements 314 and 316 are not cut-out. Also, it can be seen that element 332 is not secured within a sub-aperture. Thus, many different element types or elements placed in different locations can be used to form a dual band system, according to the present invention.

Lens elements 310 and 330 form focusing element 346. Focusing mechanism 348, which can be any of a number of electronic or mechanical devices (e.g., motor, cam, screw), moves element 346 along path 350 to adjust the focus of both images 322 and 344 at the same time. Because one motion focuses light along both paths 320 and 342 at the same time and by the same amount, changes in object distance can be corrected for both optical subsystems 317 and 337. Because subsystems 317 and 337 are coaxial, there is no parallax.

TABLE 1A through TABLE 1B contain a prescription (performed on the ZEMAX lens design software of Focus Software of Tucson, Ariz.) for an embodiment of a dual infrared and visible optical system, according to the present invention. Optical subsystem 317, having the larger aperture, is the infrared subsystem, described in TABLE 1A and TABLE 1 B. Making the infrared optical subsystem 317 with the larger portion of the aperture can help with diffraction blur, which is worse in the longer wavelengths of the infrared. Of course, this effect also depends on the diameter of subsystem 337. The visible elements are described in TABLE 1C. TABLE 1D describes possible focus positions from infinity to near-focus.

TABLE 1A

IR SURFACE DATA

| Surf | Type | Radius (mm) | Thick (mm) | Glass | Dia (mm) | Conic |
|---|---|---|---|---|---|---|
| OBJ | STD | Infinity | Infinity | | 0 | 0 |
| 1 | STD | Infinity | 50 | | 61.16146 | 0 |
| 2 | STD | 63.42498 | 6 | AMTIR4 | 50.90581 | −0.7739041 |
| 3 | STD | 750.2383 | 10 | | 50.1996 | 0 |
| 4 | STD | −49.07076 | 4.5 | AMTIR4 | 41.75451 | 0 |
| STO | BIN_2 | −86.2833 | 27.60546 | | 42.75661 | 6.517522 |
| 6 | STD | 21.78942 | 5 | AMTIR4 | 21.75929 | 0 |
| 7 | STD | 23.31248 | 11.76972 | | 18.13065 | 1.586647 |
| 8 | STD | Infinity | 1 | GE_LONG | 11.01212 | 0 |
| 9 | STD | Infinity | 0 | | 10.84075 | 0 |
| IMA | STD | Infinity | 10.84075 | | 0 | |

TABLE 1B

SURFACE DATA DETAIL

| Surface STO | BINARY_2 |
|---|---|
| Diffract Order | 1 |
| Coeff on r 2 | 0 |
| Coeff on r 4 | −2.9405054e−006 |
| Coeff on r 6 | 2.0090442e−009 |
| Coeff on r 8 | 6.3599093e−014 |
| Coeff on r 10 | 1.9619292e−015 |
| Maximum term | 4 |
| Maximum rad ap | 28 |
| Term on P to 2 | −71.430552 |
| Term on P to 4 | −194.74879 |
| Term on P to 6 | 744.14389 |
| Term on P to 8 | −685.68238 |

TABLE 1C

Visible SURFACE DATA

| Surf | Type | Radius (mm) | Thick (mm) | Glass | Dia (mm) | Conic |
|---|---|---|---|---|---|---|
| OBJ | STD | Infinity | 6.8e+009 | | 1.4959e+9 | 0 |
| 1 | STD | 36.79642 | 1.36 | F2 | 12 | 0 |
| 2 | STD | 388.6092 | 8.5 | | 12 | 0 |
| STO | STD | −17.34062 | 0.68 | FK5 | 9 | 0 |
| 4 | STD | 16.56215 | 6.084034 | | 9 | 0 |
| 5 | STD | −933.3208 | 3.4 | SK5 | 12 | 0 |
| 6 | STD | −8.625559 | 3.4 | SF11 | 12 | 0 |
| 7 | STD | −17.53535 | 0.1 | | 12 | 0 |
| 8 | STD | 47.34954 | 3 | BK7 | 12 | 0 |
| 9 | STD | −22.6334 | 1 | | 12 | 0 |
| 10 | STD | Infinity | 6.35 | BK7 | 12.7 | 0 |
| 11 | CDBRK | — | | | 0 | — |
| 12 | STD | Infinity | 0 | MIRROR | 17.96051 | 0 |
| 13 | CBRK | — | −6.35 | | — | — |
| 14 | STD | Infinity | −23.55 | | 12.7 | 0 |
| IMA | STD | Infinity | | | 5.814062 | 0 |

TABLE 1D

MULTI-CONFIGURATION DATA:

Configuration 1

| 1 Thickness 0 | 1e+010 |
|---|---|
| 2 Thickness 3 | 10 |

Configuration 2

| 1 Thickness 0 | 3000 |
|---|---|
| 2 Thickness 3 | 10.58457 Variable |

Configuration 3

| 1 Thickness 0 | 1000 |
|---|---|
| 2 Thickness 3 | 11.80299 Variable |

Figure 4A:
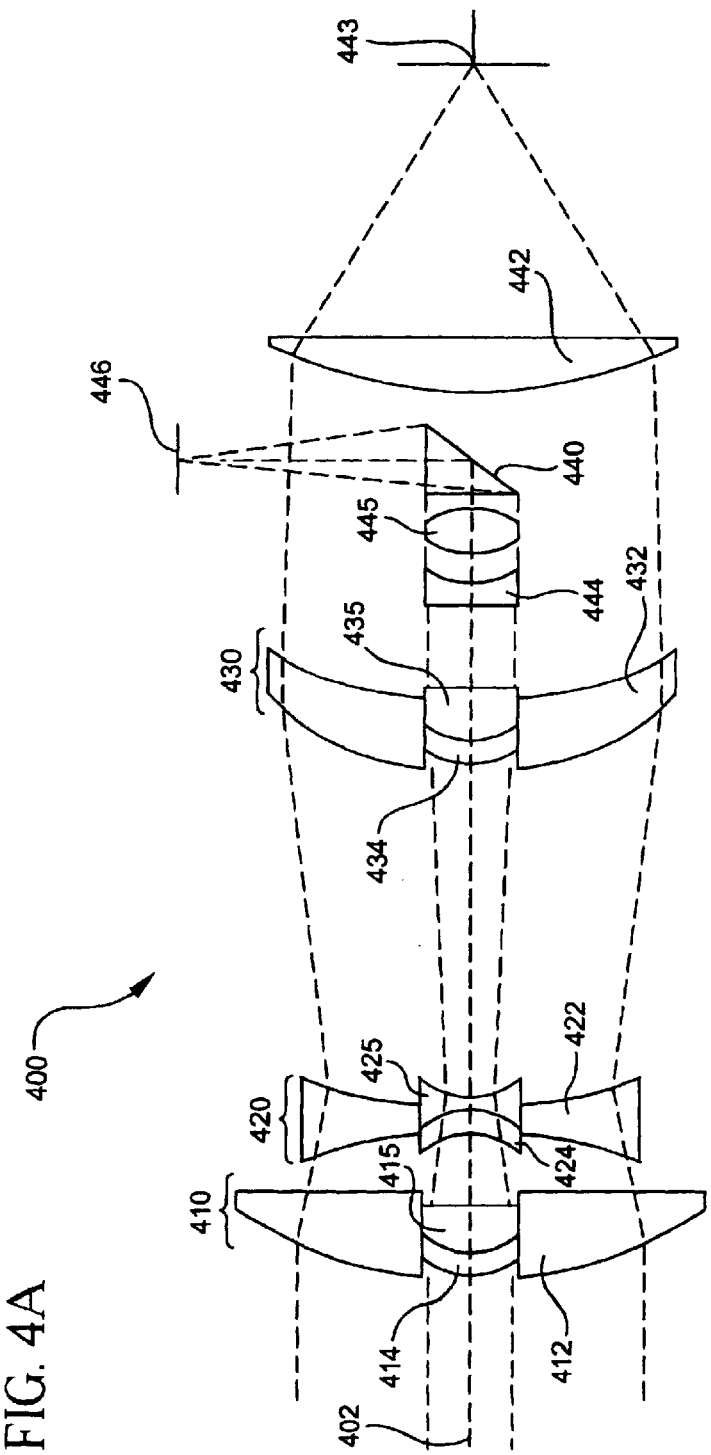
FIG. 4A is a plan view of a dual band zoom lens, according to the present invention.

FIG. 4A is a plan view of a dual band zoom lens, according to the present invention. A zoom lens typically consists of a focus group, a zoom group, a variator group, and a fixed group. Dual wavelength zoom lens 400 includes focus group 410, variator group 420, compensator group 430, and fixed lenses 442, 444, and 445.

In some embodiments, lens 400 images visible and infrared light. In such an embodiment, focus group 410 is made up of infrared element 412 and a visible doublet formed of elements 414 and 415; variator group 420 is made up of infrared element 422 and a visible doublet formed of elements 424 and 425; compensator group 430 is made up of infrared element 432 and a visible doublet formed of elements 434 and 435. In some embodiments, reflective element 440 is used to bend the visible optical path away from original optical axis 402, thus providing physical access to the visible optical path, separate from the infrared optical path. Element 442 is a fixed group for the infrared channel and elements 444 and 445 form a visible doublet fixed group for the visible channel. Thus, motion of group 410 controls focus, motion of group 420 controls focal length, motion of group 430 compensates for motion of group 420, and fixed elements 442, 444, and 445 complete the imaging subsystems. Motions of the focus, variator, and compensator groups in a zoom lens are typically accomplished by rotating cams or individual motors.

Infrared light travels along an infrared optical path, through an optical subsystem formed of elements 412, 422, 432, and 442, coming to a focus at point 443. Visible light travels along a visible optical path, through an optical subsystem formed of elements 414, 415, 424, 425, 434, 435, 444, and 445, and comes to a focus at point 446. A portion of the infrared lens elements, elements 412, 422, and 432, have central apertures, near to which a portion of the visible elements 414, 415, 424, 425, 434, and 435 have been fixed. Those skilled in the art will recognize that FIG. 4A is illustrative of many possible designs, and that additional fixed or moving lens elements can be added to, or elements can be modified in, either or both the infrared or visible channel, to adjust the optical properties of lens 400.

TABLE 2A is a prescription for the infrared subsystem of an embodiment of lens 400, as described by the ZEMAX optical design software of Focus Software of Tucson, Ariz. TABLE 2B is a prescription for the visible subsystem of an embodiment of lens 400.

TABLE 2A

| Surf | Type | Radius | Thick | Glass | Dia (mm) | Conic |
|---|---|---|---|---|---|---|
| OBJ | STANDARD | Infinity | Infinity | | | |
| 1 | STANDARD | 72.68131 | 6 | AMTIR4 | 52 | 1.081439 |
| 2 | BINARY_2 | 2847.093 | 1 | | 52 | |
| 3 | STANDARD | Infinity | 1.893045 | | 28.30202 | |
| 4 | STANDARD | −46.08211 | 2.4 | AMTIR4 | 30 | −6.43137 |
| 5 | BINARY_2 | 53.02568 | 17.95646 | | 30 | −1.562856 |
| 6 | STANDARD | 45.52305 | 5 | AMTIR4 | 42 | −4.07756 |
| 7 | BINARY_2 | 214.604 | 8.951938 | | 42 | −2.800258 |
| STO | STANDARD | Infinity | 19.3061 | | 36.48307 | |

TABLE 2A-continued

| Surf | Type | Radius | Thick | Glass | Dia (mm) | Conic |
|---|---|---|---|---|---|---|
| 9 | EVENASPH | 50.59115 | 4 | AMTIR4 | 37 | −1.510571 |
| 10 | BINARY_2 | 669.0731 | 25.14 | | 37 | |
| 11 | STANDARD | Infinity | 1 | GE_LONG | 11.75859 | |
| 12 | STANDARD | Infinity | 0.5 | | 11.5516 | |
| IMA | STANDARD | Infinity | | | 11.09906 | |

TABLE 2B

| Surf | Type | Radius (in) | Thickness (in) | Glass | Diameter (in) | Conic |
|---|---|---|---|---|---|---|
| OBJ | STD | Infinity | 3.937008e+8 | | 2.16443e+8 | 0 |
| 1 | STD | 0.9536221 | 0.03937008 | F2 | 0.6299213 | 0 |
| 2 | STD | 0.4923513 | 0.1968504 | BK7 | 0.6299213 | 0 |
| 3 | STD | −3.961359 | 0.03937008 | | 0.6299213 | 0 |
| 4 | STD | Infinity | 0.07452756 | | 0 | 0 |
| 5 | STD | −0.7321447 | 0.05511811 | SF6 | 0.4724409 | 0 |
| 6 | STD | −0.3410998 | 0.03937008 | LAKN12 | 0.4724409 | 0 |
| 7 | STD | 0.6637404 | 0.7069472 | | 0.4724409 | 0 |
| STO | STD | 0.9835458 | 0.03937008 | LAF2 | 0.3937008 | 0 |
| 9 | STD | 0.3407645 | 0.1574803 | SK4 | 0.3937008 | 0 |
| 10 | STD | −2.749945 | 0.1949031 | | 0.3937008 | 0 |
| 11 | STD | Infinity | 0 | | 0 | 0 |
| 12 | STD | 1.683481 | 0.07874016 | SF57 | 0.4724409 | 0 |
| 13 | STD | 0.5892404 | 0.04897531 | | 0.4724409 | 0 |
| 14 | STD | 0.7205954 | 0.1574803 | LAKN12 | 0.4724409 | 0 |
| 15 | STD | −0.7043201 | 0.1574803 | | 0.4724409 | 0 |
| 16 | CBRK | — | 0 | | — | — |
| 17 | STD | Infinity | 0 | MIRROR | 0.5497474 | 0 |
| 18 | CBRK | — | −0.8267717 | — | — | — |
| IMA | STD | Infinity | | | 0.3287124 | 0 |

TABLE 3

| | |
|---|---|
| Aperture | Circular Aperture |
| Minimum Radius | 0 |
| Maximum Radius | 25.2 mm |
| Surface 2 | BINARY_2 |
| Diffract Order | 1 |
| Coeff on r 2 | 0 |
| Coeff on r 4 | 8.6438078e−007 |
| Coeff on r 6 | −1.1018959e−010 |
| Maximum term | 1 |
| Maximum rad ap | 26 mm |
| Term on P to 2 | −47.916994 |
| Aperture | Floating Aperture |
| Maximum Radius | 26 mm |
| Aperture | Circular Aperture |
| Minimum Radius | 0 |
| Maximum Radius | 14.2 mm |
| Surface 5 | BINARY_2 |
| Diffract Order | 1 |
| Coeff on r 2 | 0 |
| Coeff on r 4 | −2.0200256e−006 |
| Coeff on r 6 | 6.5985686e−010 |
| Maximum term | 1 |
| Maximum rad ap | 15 |
| Term on P to 2 | 39.46 |
| Aperture | Floating Aperture |
| Maximum Radius | 15 |
| Surface 7 | BINARY_2 |
| Diffract Order | 1 |
| Coeff on r 2 | 0 |
| Coeff on r 4 | −2.0632414e−006 |
| Coeff on r 6 | 1.8567942e−009 |
| Maximum term | 1 |
| Maximum rad ap | 21 |
| Term on P to 2 | −34.195207 |
| Aperture | Floating Aperture |
| Maximum Radius | 21 |
| Surface 9 | EVENASPH |
| Coeff on r 2 | 0 |

TABLE 3-continued

| | |
|---|---|
| Coeff on r 4 | −7.3770432e−006 |
| Coeff on r 6 | −1.3774416e−008 |
| Aperture | Circular Aperture |
| Minimum Radius | 0 |
| Maximum Radius | 17.6 |
| Surface 10 | BINARY_2 |
| Diffract Order | 1 |
| Coeff on r 2 | 0 |
| Coeff on r 4 | −7.4626349e−006 |
| Coeff on r 6 | −8.4132712e−009 |
| Coeff on r 8 | 0 |
| Maximum term | 1 |
| Maximum rad ap | 18.5 |
| Term on P to 2 | −30.9673 |
| Aperture | Floating Aperture |
| Maximum Radius | 18.5 |

FIG. 4B–FIG. 4E illustrate the motion of infrared subsystem elements 412, 422, and 432, relative to fixed element 442, through zoom. TABLE 4A describes the zoom motions of the infrared subsystem within lens 400, as shown in FIG. 4B–FIG. 4E. Configurations 1 through 4 in TABLE 4A correspond to FIG. 4B through FIG. 4E.

TABLE 4A

MULTI-CONFIGURATION DATA:

Configuration 1
1 Stop Surf         8
2 Aperture (mm)     25
3 Thickness (mm)    1.176e+010
4 Field vdy 2       −0.01516838
5 Field vcy 2       0.01517066
6 Field vdy 3       −0.007223461

TABLE 4A-continued

MULTI-CONFIGURATION DATA:

| | |
|---|---|
| 7 Field vcy 3 | 0.07068578 |
| 8 Y-field 2 | 10.76 |
| 9 Y-field 3 | 15.37 |
| 10 Thickness 2 | 1 |
| 11 Thickness 3 | 1.893045 Variable |
| 12 Thickness 5 | 17.95646 Variable |
| 13 Thi So P2 7 | 36.20144 Variable |
| Configuration 2 | |
| 1 Stop Surf | 8 |
| 2 Aperture | 42 |
| 3 Thickness 0 | 1.176e+010 |
| 4 Field vdy 2 | 0.02730892 |
| 5 Field vcy 2 | 0.06378812 |
| 6 Field vdy 3 | 0.04207523 |
| 7 Field vcy 3 | 0.1277079 |
| 8 Y-field 2 | 6.251 |
| 9 Y-field 3 | 8.93 |
| 10 Thickness 2 | 1 Pick up from configuration 1, operand 10, scale 1, offset 0 |
| 11 Thickness 3 | 12.15629 Variable |
| 12 Thickness 5 | 11.89784 Variable |
| 13 Thi So P2 7 | 36.20144 Pick up from configuration 1, operand 13, scale 1, offset 0 |
| Configuration 3 | |
| 1 Stop Surf | 1 |
| 2 Aperture | 50 |
| 3 Thickness 0 | 1.176e+010 |
| 4 Field vdy 2 | −0.05037608 |
| 5 Field vcy 2 | 0.05038193 |
| 6 Field vdy 3 | −0.06996329 |
| 7 Field vcy 3 | 0.0699695 |
| 8 Y-field 2 | 3.666 |
| 9 Y-field 3 | 5.237 |
| 10 Thickness 2 | 1 Pick up from configuration 1, operand 10, scale 1, offset 0 |
| 11 Thickness 3 | 17.84855 Variable |
| 12 Thickness 5 | 2 |
| 13 Thi So P2 7 | 36.20144 Pick up from configuration 1, operand 13, scale 1, offset 0 |
| Configuration 4 | |
| 1 Stop Surf | 1 |
| 2 Aperture | 50 |
| 3 Thickness 0 | 600 |
| 4 Field vdy 2 | −0.0212013 |
| 5 Field vcy 2 | 0.02120325 |
| 6 Field vdy 3 | −0.04582351 |
| 7 Field vcy 3 | 0.04582863 |
| 8 Y-field 2 | 3.666 |
| 9 Y-field 3 | 5.237 |
| 10 Thickness 2 | 4.592189 Variable |
| 11 Thickness 3 | 17.84855 Pick up from configuration 3, operand 11, scale 1, offset 0 |
| 12 Thickness 5 | 2 Pick up from configuration 3, operand 12, scale 1, offset 0 |
| 13 Thi So P2 7 | 36.20144 Pick up from configuration 1, operand 13, scale 1, offset 0 |

FIG. 4F–FIG. 4I illustrate the motions of visible subsystem elements 414, 415, 424, 425, 434, and 435, relative to fixed elements 444 and 445, in dual band lens 400. TABLE 4B describes the zoom motions of the infrared subsystem within lens 400. Configurations 1 through 4 in TABLE 4B correspond to FIG. 4F through FIG. 4I. In some embodiments, the motions of the corresponding visible and infrared elements will be the same, in order to provide the same zoom and focus changes to both the visible and infrared channels.

TABLE 4B

Configuration 1

| | |
|---|---|
| 1 Stop Surf | 8 |
| 2 Aperture | 0.1968504 |
| 3 Thickness 0 | 3.937008e+008 |
| 4 Field vdy 2 | −0.02025824 |
| 5 Field vdy 3 | −0.002123443 |
| 6 Field vcy 2 | 0.02025998 |
| 7 Field vcy 3 | 0.1714582 |
| 8 Y-field 2 | 10.76 |
| 9 Y-field 3 | 15.37 |
| 10 Thickness 3 | 0.03937008 |
| 11 Thickness 4 | 0.07452756 |
| 12 Thickness 7 | 0.7069472 |
| Configuration 2 | |
| 1 Stop Surf | 8 |
| 2 Aperture | 0.3228346 |
| 3 Thickness 0 | 3.937008e+008 |
| 4 Field vdy 2 | 0.1880455 |
| 5 Field vdy 3 | 0.4631203 |
| 6 Field vcy 2 | 0.1880653 |
| 7 Field vcy 3 | 0.4897827 |
| 8 Y-field 2 | 6.251 |
| 9 Y-field 3 | 8.93 |
| 10 Thickness 3 | 0.03937008 |
| 11 Thickness 4 | 0.4785941 |
| 12 Thickness 7 | 0.4684189 |
| Configuration 3 | |
| 1 Stop Surf | 5 |
| 2 Aperture | 0.4724409 |
| 3 Thickness 0 | 3.937008e+008 |
| 4 Field vdy 2 | 0.0624353 |
| 5 Field vdy 3 | 0.04725005 |
| 6 Field vcy 2 | 0.06244235 |
| 7 Field vcy 3 | 0.2760152 |
| 8 Y-field 2 | 3.66 |
| 9 Y-field 3 | 5.237 |
| 10 Thickness 3 | 0.03937008 |
| 11 Thickness 4 | 0.7026988 |
| 12 Thickness 7 | 0.07874016 |
| Configuration 4 | |
| 1 Stop Surf | 5 |
| 2 Aperture | 0.5905512 |
| 3 Thickness 0 | 23.62205 |
| 4 Field vdy 2 | 0.1297347 |
| 5 Field vdy 3 | 0.09582019 |
| 6 Field vcy 2 | 0.2561988 |
| 7 Field vcy 3 | 0.5318 |
| 8 Y-field 2 | 3.66 |
| 9 Y-field 3 | 5.237 |
| 10 Thickness 3 | 0.1807949 |
| 11 Thickness 4 | 0.7026988 |
| 12 Thickness 7 | 0.07874016 |

Figure 5:
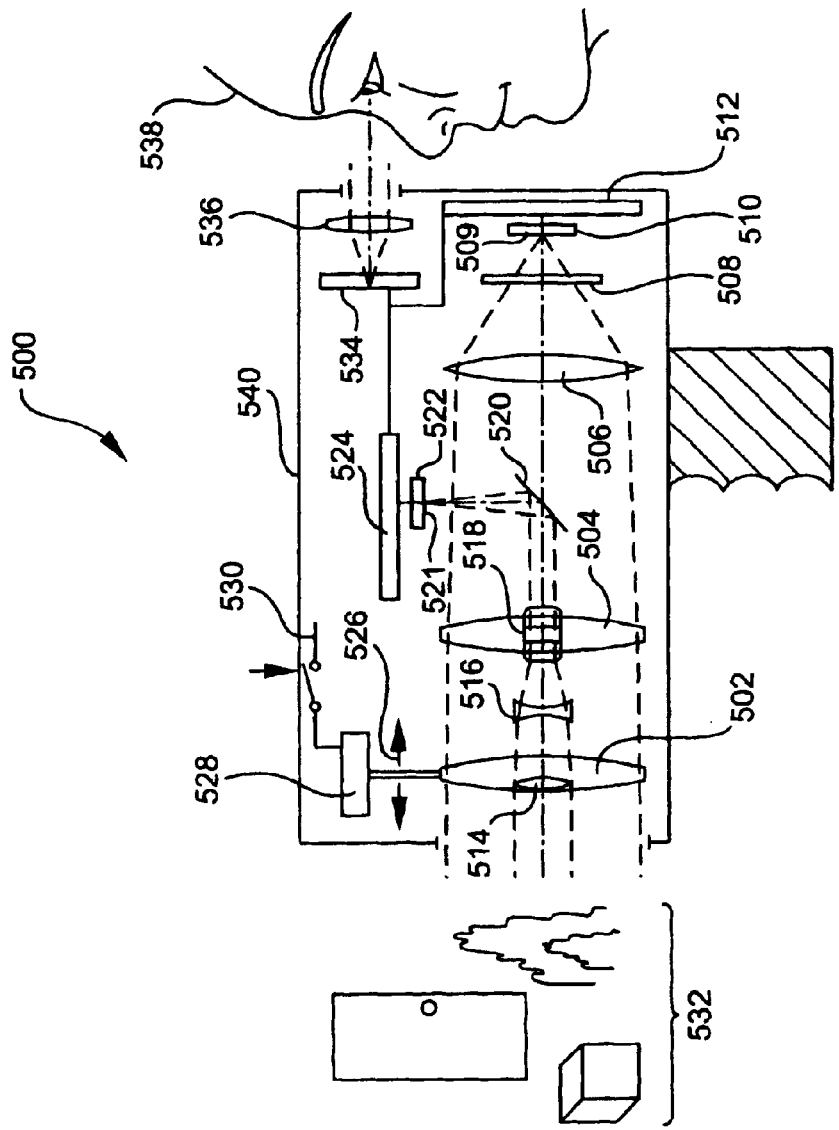
FIG. 5 is a plan view of a dual wavelength camera, according to the present invention.

FIG. 5 is a plan view of an embodiment of a dual wavelength camera, according to the present invention. Lens elements 502, 504, 506, and 508 image light of a first wavelength band (e.g., thermal infrared), forming image 509 on imaging device 510 (e.g., an infrared focal plane array). Embodiments can, of course, incorporate many optical forms. Signals from imaging device 510 are processed by card 512. Processing can also be accomplished by many other electronic configurations, or (for example) electronics built into the focal plane.

Lens elements 514, 516, and 518, and fold 520 image light of a second wavelength band (e.g., visible), forming image 521 on imaging device 522 (e.g., CMOS imager, CCD). Signals from imaging device 522 are processed by card 524. Processing can also be accomplished by many other electronic configurations, or (for example) electronics built into the focal plane.

Lens elements 502 and 514 are moved along direction 526 by focus drive 528, operated by switch 530, to focus objects in scene 532. A manual focus system could also be employed, or switch 530 could represent an auto-focus control. An image of scene 532 in either or both optical wavelength bands is projected by display 534 (e.g., LCD display, CRT) through eyepiece 536 for viewing by operator 538. Camera 500 is contained in case 540.

Mechanism 528 focuses both images 521 and 509 at the same time and by the same amount. Thus, if both images 509 and 521 are displayed on display 534, they will remain the same size and quality as focus is adjusted. The same objects in scene 532 will be in-focus in both optical wavelength bands. While lens 300 of FIG. 3 is shown in FIG. 5, lens 400 from FIG. 4, or any other configuration of dual band lens could be used in camera 500.

Thus, a single, refractive optical system can image two wavelength bands through the same aperture, compressing required space and avoiding parallax. Such an optical system can also focus or zoom images in two different wavelength bands the same amount at the same time. Thus, images in two wavelength bands can be kept at constant magnification and identical focus positions, facilitating common viewing, data processing such as data-fusion, recording, or other use of a scene, in both wavelength bands.

While various embodiments of the invention have been described, it should be understood that they have been presented by way of example and not limitation. Those skilled in the art will understand that various changes in forms or details may be made without departing from the spirit of the invention. Thus, the above description does not limit the breadth and scope of the invention as set forth in the following claims.

What is claimed is:

1. A dual optical system, comprising:
   a first optical subsystem, comprising a first set plurality of lenses, wherein, a portion of the first plurality of lenses comprise cut-out sub-apertures and remaining apertures; and
   a second optical subsystem, comprising a second set plurality of lenses; wherein, a portion of the second set of lenses are positioned within the cut-out sub-apertures of the first set of lenses,
   wherein, the first optical subsystem transmits a first band of optical wavelengths through the remaining apertures, and the second optical subsystem transmits a second band of optical wavelengths not transmitted by the first optical subsystem.

2. The dual optical system of claim 1, wherein the first optical subsystem and the second optical subsystem are refractive.

3. The dual optical system of claim 2, wherein the first set of lenses, the second set of lenses, and the sub-apertures are circular.

4. The dual optical system of claim 3, wherein a portion of the first set of lenses and a portion of the second set of lenses are disposed along a common optical axis.

5. The dual optical system of claim 4, wherein the first optical subsystem is capable of producing a first image and the second optical subsystem is capable of producing a second image.

6. The dual optical system of claim 5, wherein the first optical subsystem comprises a first subsystem focus group, the second optical subsystem comprises a second subsystem focus group, and wherein the dual optical system further comprises a first focus mechanism, attached to and capable of moving the first and second sub-system focus groups.

7. The dual optical system of claim 6, wherein the first band of optical wavelengths is an infrared band, and the second band of optical wavelengths is a visible band.

8. The dual optical system of claim 2, wherein the first optical system comprises a first subsystem focus group, the second optical subsystem comprises a second subsystem focus group, and the dual optical system further comprises a first focus mechanism, attached to and capable of moving the first and second sub-system focus groups.

9. The dual optical system of claim 8, wherein the first band of optical wavelengths is an infrared band, and the second band of optical wavelengths is a visible band.

10. The dual optical system of claim 1, further comprising:
    a focus element, the focus element comprising:
    a first lens, capable of refracting light of a first band of optical wavelengths, and having an aperture cut through it; and
    a second lens, capable of refracting light of a second band of optical wavelengths, fixed in the aperture of the first lens; and
    a focus mechanism, attached to the focus element, capable of moving the focus element.

11. The dual optical system of claim 10, wherein the first optical subsystem is capable of producing a first image formed of light from the first optical wavelength band, and the second optical subsystem is capable of producing a second image from light of the second optical wavelength band, and wherein motion of the focus element adjusts the focus of both the first image and second image.

12. The dual optical system of claim 11, wherein the optical system is receptive of light along a common light path, and further comprising:
    a first output light path;
    a second output light path; and
    a fold element, capable of directing a portion of light of the first optical band along a first output light path,
    and wherein light of the second optical band exits along a second output light path.

13. The dual optical system of claim 12, wherein the first band of optical wavelengths is an infrared band, and the second band of optical wavelengths is a visible band.

14. The dual optical system of claim 12, further comprising:
    a first recording means, for recording the first image positioned in the first output path; and
    a second recording means, for recording the second image positioned in the second output path.

15. The dual optical system of claim 14, further comprising display means, for displaying the first image and/or the second image to an operator.

16. The dual optical system of claim 15, wherein the first band of optical wavelengths is an infrared band, and the second band of optical wavelengths is a visible band.

17. A dual optical system, comprising:
    a first optical subsystem, comprising a first set of lenses, wherein, a portion of the first set of lenses comprise cut-out sub-apertures; and
    a second optical subsystem, comprising a second set of lenses; wherein, a portion of the second set of lenses are positioned within the sub-apertures of the first set of lenses, wherein
    the first optical subsystem further comprises a first variator group and a first compensator group, and
    wherein the second optical subsystem further comprises a second variator group in contact with the first variator group and a second compensator group in contact with the first compensator group, and wherein the dual optical system further comprises a zoom mechanism, capable of moving the first and second variator groups and the first and second compensator groups.

18. A dual band optical system, comprising:

a first imaging means, receptive of light of a first wavelength band, for forming a first image, and having a first annular aperture;

a second imaging means, receptive of a second wavelength band, for forming a second image, and having a second aperture, wherein the second aperture is contained within the first aperture; and a focusing means, for adjusting focus of the first image and the second image, simultaneously; and a dual band focus group, capable of adjusting focus in both the infrared and visible paths, simultaneously.

19. A dual band lens, having a visible optical path and an infrared optical path, comprising:

A dual-band focus group, comprising
   an annular first infrared lens element having an inner radius, and
   a circular first visible lens element, located within the inner radius of the annular infrared lens element;
a fixed infrared imaging group, comprising a plurality of fixed infrared lens elements; and
a fixed imaging, comprising a plurality of fixed visible lens elements;
wherein, the dual-band focus group and the fixed infrared imaging group are placed along the infrared optical path, and wherein the dual and focus group and the fixed imaging group are placed along the visible optical path; and
a dual band focus group, capable of adjusting focus in both the infrared and visible paths, simultaneously.

20. The dual band lens of claim 19, wherein a portion of the plurality of fixed infrared lens elements comprise cutout sub-apertures, and wherein a portion of the visible optical path passes through the cut out sub-apertures.

21. A dual band lens, having a visible optical path and an infrared optical path, comprising:

a dual-band focus group, comprising
   an annular first infrared lens element having an inner radius, and
   a circular first visible lens element, located within the inner radius of the annular infrared lens element;
a fixed infrared imaging group, comprising a plurality of fixed infrared lens elements; and
a fixed visible imaging group, comprising a plurality of fixed visible lens elements;
wherein, the dual band focus group and the fixed infrared imaging group are placed along the infrared optical path, and wherein the dual and focus group and the fixed visible imaging group are placed alone the visible optical path,
wherein a portion of the plurality of fixed infrared lens elements comprise cut-out sub-apertures, and wherein a portion of the visible optical path passes through the cut out sub-apertures, further comprising:

a dual-band variator group, comprising an infrared variator element positioned along the infrared optical path and a visible variator element positioned along the visible optical path, in contact with the infrared variator element;

a dual-band compensator group, comprising an infrared compenstator element positioned along the infrared optical path and a visible compensator element positioned along the visible optical path, in contact with the infrared compensator element; and a zoom mechanism, in contact with the dual band variator group and the dual band compensator group, capable of zooming the dual band lens.

* * * * *